(12) United States Patent
Narayan et al.

(10) Patent No.: US 7,153,354 B2
(45) Date of Patent: Dec. 26, 2006

(54) CHEMICALLY MODIFIED PLASTICIZED STARCH COMPOSITIONS BY EXTRUSION PROCESSING

(75) Inventors: Raamani Narayan, Okemos, MI (US); Sunder Balakrishnan, Okemos, MI (US); Yogaraj Nabar, East Lansing, MI (US); Boo-Young Shin, Kyoungsan (KR); Philippe Dubois, Ciplet (BE); Jean-Marie Raquez, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 10/993,309

(22) Filed: Nov. 19, 2004

(65) Prior Publication Data

US 2006/0107945 A1     May 25, 2006

(51) Int. Cl.
*C08L 3/06*     (2006.01)
*C08B 31/04*    (2006.01)

(52) U.S. Cl. .............................. 106/207.1; 106/207.5; 536/48

(58) Field of Classification Search ................ 536/48; 106/207.1, 207.5
See application file for complete search history.

(56) References Cited

U.S. PATENT DOCUMENTS

| 3,732,207 | A | * | 5/1973 | Kovats ...................... 536/103 |
| 4,011,392 | A | * | 3/1977 | Rudolph et al. ............ 536/108 |
| 4,231,803 | A | * | 11/1980 | Bovier et al. ............ 106/162.1 |
| 2003/0141637 | A1 | * | 7/2003 | Kesselmans et al. ........ 264/555 |

* cited by examiner

*Primary Examiner*—David M. Brunsman
(74) *Attorney, Agent, or Firm*—Ian C. McLeod; Steven E. Merritt (57) ABSTRACT

A chemically modified plasticized starch (CMPS) is prepared by reacting starch with an organic dibasic acid or an anhydride of the acid in the presence of a plasticizer using optional free radical initiators, and optionally with the incorporation of nano clays in the reactive extrusion process. The starch is thermoplastic and has a lower viscosity than the traditional thermoplastic starch. The CMPS is useful in preparing starch polymer compositions which are at least partially biodegradable.

24 Claims, 5 Drawing Sheets

CHEMICALLY MODIFIED PLASTICIZED STARCH COMPOSITIONS BY EXTRUSION PROCESSING

CROSS-REFERENCE TO RELATED APPLICATIONS

Not Applicable

STATEMENT REGARDING FEDERALLY SPONSORED RESEARCH OR DEVELOPMENT

Not Applicable

STATEMENT REGARDING GOVERNMENT RIGHTS

Not Applicable

BACKGROUND OF THE INVENTION (1) Field of the Invention

The present invention relates to a biodegradable chemically modified plasticized starch (CMPS) composition, and a chemically modified starch-nanoclay CMPS composition, and to a process for the preparation thereof. The invention preferably relates to a twin screw extrusion process for manufacturing the chemically modified starch composition by reacting starch with a dibasic acid or anhydride of the acid as a modifier in the presence of plasticizer and an optional free radical initiator for the acid or anhydride to provide the plasticized starch compositions which have improved processability and reduced viscosity, and is particularly useful when combined with other thermoplastic polymers.

(2) Description of Related Art

In the last two decades, considerable effort has gone into the development of biodegradable polymers and blends using starch. The processing characteristics and mechanical properties of unmodified starch polymers are very poor compared to typical synthetic polymers.

The prior developments in the area of biodegradable materials from starch involve the use of an external plasticizer to solvate the starch granules and impart melt processability and enhance the room-temperature flexibility of the final product. Some of the earliest efforts on such materials were discussed in U.S. Pat. No. 3,312,641 (A. E. Staley Mfg. Co.) and Canadian Patent Appl. No. 838,572 (USDA, Lincoln, Nebr.). The subject of these patents was the extrusion of amylose primarily using water as a plasticizer. In addition, poly (vinyl alcohol), glycerol and other related materials were also incorporated in the system. Cast films from water-based dispersions of starch, glycerol and other polymers were evaluated in U.S. Pat. Nos. 3,949,145, 4,133,784, and 4,337,181 (USDA, Peoria, Ill.). More recently, extruded compositions using water were discussed in Eur. Pat. Appl. EP 282,451, 304,401, 327,505, 404,723, 404,728, and 408,503 (Warner Lambert Co.); water-free systems using glycerol were discussed in PCT Int. Appl. WO 90/05,161 (Tomka); and formulations using both water and other plasticizers like glycerol were the subject of PCT Int. Appl. WO 92/19680 (Novamont S.p.a.), Eur. Pat. Appl. EP 400,531 (Butterfly S.r.l.), and PCT Int. Appl. WO 90/14,388 (Agri-Tech Industries, Inc.).

WO92/19680 (Novamont) describes the use of undried starch (about 12% moisture) in biodegradable polymeric compositions. These compositions produce films whose properties are sensitive to moisture. WO93/00116 (P&G) describes plastic compositions, which use "destructurized" starch, a form where the crystallinity of the starch has been destroyed by heating. The term "destructurized starch" refers to starch in which the granular, crystalline structure is destroyed resulting in the formation of a homogeneous, amorphous material that melts and flows like a thermoplastic. The "destructurization" process is accomplished by heating starch granules in the presence of water at elevated temperatures and pressures in a closed volume like an extruder. The higher the amount of water used, the lower the temperature needed for "destructurization" to be completed. Typical compositions for the "destructurization" processes include extruding starch with about 15–20% water by weight along with other additives. It has been argued that the concept of "destructurization" is just a new name ascribed to an old concept of gelatinization and/or plasticization of starch that first originated in the food industry. The term gelatinization refers to the process of disruption of the granular structure of starch by heating a starch suspension at temperatures in the range of 50°–80° C. Traditional processing in the food industry involves further heating and mixing of starches to result in the formation of a homogeneous plasticized mass as discussed by Shogren, R. L., et al., Starch/Starke 45, 276–280 (1993). The plasticization of starch using water and glycerol has been reported as early as 1947 for pharmaceutical applications ("The Pharmacopoeia of the United States of America", XIII, p. 513–514, 1947).

The principal difference between the various applications has to do with the ratios of starch and plasticizer (water, glycerol or both) used in the composition. This leads to differences in the rheological and final characteristics of each composition that is suited to the specific application. A high proportion of plasticizer (70–90% by weight) results in a jelly-like material. Medium plasticizer contents (40–70% by weight) are more suited for food applications that have good elasticity combined with reasonable rigidity to be able to form and shape various products. Low plasticizer contents (10–40% by weight) are appropriate for plastics applications that require greater rigidity and better mechanical strength characteristics. More recently, plasticization of starch in the absence of water, using polyhydric alcohols like glycerol and sorbitol has been reported. The term plasticization in the classical sense as used in the polymer industry involves transformation of a rigid, crystalline material into a pliable, less crystalline (if not amorphous) material with a lowered glass transition temperature. Japanese Patent No. 04-48,851 discloses the manufacture of biodegradable sheets based upon mixtures of starch and biodegradable polyesters derived from reactions of diols and acids. The starch has normal moisture content of about 10 to 12% by weight.

In a typical plasticized system with starch, the diffusion of plasticizer out of the product when exposed to low humidity conditions and diffusion of water into the product under high humidity conditions is an inevitable result. This causes embrittlement of the product due to loss of plasticizer (low humidity) and problems associated with retention of product shape, texture, and form due to excess absorbed water (high humidity). These effects are detrimental especially when water is used as a plasticizer, but are prevalent even in non-water based starch formulations that incorporate hygroscopic plasticizers. In general, due to the poor durability of plasticized starch upon exposure to different environments (due to its hydrophilic nature) there is likely to be very little commercial use of plasticized native or unmodified starch by itself.

Physical or chemical modifications of the starch are a viable alternative to solving some of these problems. Physical modifications include coating the starch granules with hydrophobic sizing agents and binders similar to those used in the paper industry, like rosin, proteins, like soy proteins and silanes or physically coating the end product with hydrophobic materials like low molecular weight waxes, and natural resins (zein, rosin, shellac and the like) and higher molecular weight non-polar polymers. Cross-linking of the starch granules or plasticized starch is another physical modification route to improving the hydrophobicity of starch-based materials. Chemical modifications include grafting reactions and non-degradative substitution of the hydroxyls on the starch with functional groups like esters, ethers, isocyanates and the like. Cyclic dibasic acid anhydrides such as succinic anhydride yield starch esters containing a free carboxylate group that increases the water-holding capacity of the product (U.S. Pat. No. 2,461,139; 1949). The same chemistry can be carried out with maleic anhydride to yield the maleate half ester. Treatment of a starch suspension with a cyclic dicarboxylic acid anhydride containing a hydrophobic substituent group yields products with emulsion stabilizing properties (U.S. Pat. No. 2,661,349; 1953). These starch esters have value as dispersants in coatings replacing commercially available paint containing dispersants. U.S. Pat. No. 3,732,207 discusses the production of starch esters by heating starch with maleic or succinic anhydride at 100–155° C. in a batch process with reaction times of 10 hours in the presence of 0.5–15% moisture to give a product with degree of substitution (DS) 0.02 to 0.04.

Tomasik et al., Starch 47 96 (1995) reacted corn starches in extruders containing varying amounts of moisture (18, 20 and 30%) with succinic, maleic and phthalic anhydrides to form starch esters. Carbonate buffer, either pH 8 or pH 9 was added as a medium during extrusion. It is demonstrated that extrusion of starch with cyclic anhydrides in alkaline medium presents a facile method of preparation of anionic starches of hydrophobic character based. However, this method has several serious limitations resulting from the chemistry and the extrusion process. For example, it is extremely difficult to extrude these samples at temperatures of around 130° C. due to the resultant high viscosity of the starch melt. Also, the use of water is extremely problematic in processing and quality of the final product.

Related prior art is described in:

(1) Ramani Narayan, Steven Bloembergen and Amit Lathia, A Method of Preparing Biodegradable Modified-Starch Moldable Products and Films, U.S. Pat. No. 5,869,647, Feb. 9, 1999, July 1993;

(2) Narayan, R., Biodegradable Multi-Component Polymeric Materials Based on Unmodified Starch-Like Polysaccharides, U.S. Pat. No. 5,500,465, Oct. 31, 1995;

(3) Narayan, R., Krishnan, M., DuBois, P., Polysaccharides Grafted With Aliphatic Polyesters Derived From Cyclic Esters, U.S. Pat. No. 5,540,929, Jul. 30, 1996;

(4) Narayan, R., Krishnan, M., DuBois, P., Polysaccharides Grafted With Aliphatic Polyesters Derived From Cyclic Esters, U.S. Pat. No. 5,578,691, Nov. 26, 1996;

(5) Narayan, R., Krishnan, M., DuBois, P., Polysaccharides Grafted With Aliphatic Polyesters Derived From Cyclic Esters, U.S. Pat. No. 5,616,671, Apr. 1, 1997;

(6) U.S. patent application co-filed with the present application.

OBJECTS

It is an object of the present invention to provide a chemically modified plasticized starch and plasticizer compositions which have improved properties. It is further an object of this invention to provide a process which is economical and reproducible. These and other objects will become increasingly apparent by reference to the following description.

SUMMARY OF THE INVENTION

The present invention relates to biodegradable, reactive, chemically modified plasticized starch (CMPS) compositions with low viscosity and good processability. Further, the present invention relates to a continuous reactive extrusion process for manufacturing the compositions. An important aspect of this invention is that the process uses no added water, and prevents problems such as high viscosity, clogging of the thermoplastic starch melt at the die or foaming of the thermoplastic starch melt. Furthermore, the resulting chemically modified starch composition is highly reactive to yield graft copolymers with polyesters as described in detail in our co-pending patent application, which is incorporated herein by reference. These starch-polyester graft copolymers are readily processable into films, and molded products using conventional plastics processing equipment, and the resultant product has the most preferred balance in mechanical properties, water resistance, processability and the rate of biodegradation. The invention also describes a new chemically modified starch-nano clay composition with improved dispersability of the nano clay in the matrix, reactivity and processability for subsequent reaction with polyesters as described in our co-pending patent application.

In accordance with the present invention, there is provided a biodegradable, reactive low viscosity chemically modified plasticized starch composition (CMPS) prepared by the reactive blending or extrusion processing of starch in the presence of chemical modifiers, a plasticizer and an optional free-radical initiator.

The present invention also provides a biodegradable chemically modified starch-nano clay product prepared by reactive extrusion processing of starch in the presence of modifiers, plasticizers and nanoclay material.

The present invention also relates to a composition which comprises a mixture of starch esters of a dibasic acid or an anhydride of a dibasic acid, wherein the mixture has reduced viscosity from a natural starch in dimethyl sulfoxide.

The present invention also relates to a starch based composition which comprises a reacted mixture of a biodegradable starch polymer, a chemical modifier selected from the group consisting of a dibasic organic acid, and anhydride of the dibasic organic acid, or mixtures thereof, and a plasticizer.

In particular the present invention relates to a starch based composition which comprises a reactively extruded mixture of a biodegradable starch polymer, a chemical modifier selected from the group consisting of a dibasic organic acid, an anhydride of a dibasic organic acid and mixtures thereof, a plasticizer and, optionally a free radical initiator for the reaction, wherein the mixture has been extruded with heating and venting of water from the mixture.

Further, the present invention relates to a biodegradable, chemically modified starch based composition which comprises a reactively extruded mixture comprising a biodegradable starch polymer, a chemical modifier selected from the group consisting of a dibasic organic acid, an anhydride of a dibasic organic acid and mixtures thereof, a plasticizer optionally a free radical initiator for the reaction and a nanoclay, wherein the mixture has been extruded with heating and venting of water from the mixture.

Preferably the starch polymer is selected from the group consisting of cornstarch, potato starch, tapioca starch, rice starch, wheat starch, and cassaya starch. Preferably the starch polymer in the mixture is present in an amount between about 5% to 90% by weight of the mixture. Preferably the starch polymer is an unmodified, oxidized or thin boiling starch of 0 to 95 degree fluidity. Preferably the starch polymer has moisture content of about 0.5% to 15% by weight. Preferably the starch polymer is in a pulverized form. Preferably the plasticizer is a polyhydric alcohol. Preferably the plasticizer is present in an amount between about 10 to 50 wt. % of the mixture. Preferably the chemical modifier is present in an amount between about 0.5% to about 10% by weight of the starch polymer. Preferably the nanoclay is selected from a group consisting of montmorillonite; smectite, hectorite and mixtures thereof. Preferably the nanoclay is present in an amount between about 0.5 to 25 wt. % of the mixture. Preferably the free radical initiator is 2,5-Bis(tert-butylperoxy)-2,5-dimethylhexane or other organic peroxide. Preferably the free radical initiator is present in the mixture in an amount between about 0.01 to 2.0 wt % of the mixture. Preferably the mixture is processed in a twin-screw extruder at a temperature in the range of about 100° C. to 200° C. Preferably the anhydrides are selected from the group consisting of maleic-, succinic-, itaconic-, phthalic- and mixtures thereof. Preferably the chemical modifier is about 2% to 5% by weight of the starch polymer of the mixture.

The present invention also relates to a process for preparing a starch based composition which comprises reactively extruding a mixture which comprises a biodegradable starch polymer, a chemical modifier selected from the group consisting of a dibasic organic acid, an anhydride of a dibasic organic acid and mixtures thereof, a plasticizer and, optionally a free radical initiator wherein the mixture is extruded with heating and venting of water from the mixture. Preferably the starch polymer and modifier are mixed as powders. The processing is preferably at 100–250° C.

BRIEF DESCRIPTION OF THE FIGURES

Other advantages of the present invention will be readily appreciated as the same becomes better understood by reference to the following detailed description when considered in connection with the accompanying drawings wherein.

DETAILED DESCRIPTION OF THE INVENTION

The present invention provides (i) a biodegradable chemically modified starch composition, (ii) a biodegradable chemically modified starch-nanoclay composition, (iii) and a method for making thereof wherein, generally, the composition is prepared by continuous reactive extrusion processing. Preferably, the present invention concerns a) biodegradable, highly reactive, chemically modified starch composition with low viscosity and high processability, that yields graft copolymers with biodegradable polyesters as described in our co-pending patent application. Another object of the present invention is to provide b) a new chemically modified starch-nanoclay composition with improved dispersability of the nanoclay in the matrix, reactivity and processability for subsequent reaction with polyesters as described in our co-pending patent application.

The components of the biodegradable chemically modified starch composition that are employed in the process that is within the scope of this invention preferably include the following:

(I) Starch preferably selected from the group of potato starch, corn starch, waxy starch, tapioca starch, rice starch, wheat starch, and cassaya starch and the like (II) Plasticizer preferably selected from the group of polyhydroxy compounds including glycerol, ethylene glycol, and the like (III) Modifier selected from the group of dibasic acids and their cyclic anhydride compounds; and (IV) Optionally, free radical initiator selected from the group of peroxides, and the like.

The proposed reactions are:

Maleation Chemistry

Transesterification Chemistry

-continued

Anhydrides ← Modified Starch

Starch $(C_6H_{10}O_5)_n$, is a mixture of linear (amylose) and branched (amylopectin) polymers. Amylose is essentially a linear polymer of .alpha.(1.fwdarw.4) linked D-glucopyranosyl units. Amylopectin is a highly-branched polymer of D-glucopyranosyl units containing .alpha.(1.fwdarw.4) linkages, with .alpha.(1.fwdarw.6) linkages at the branch points. The process of the present invention can use various types of starches, such as regular corn starch which contains about 75% amylopectin (higher molecular weight branched starch polymer) and 25% amylose (lower molecular weight linear starch polymer), as well as hybrid corn starch products containing more than 50% amylose, sold by Corn Products, Inc. (Chicago, Ill.). Various other starches, such as potato starch, tapioca starch, rice starch, wheat starch, cassaya starch, and other starches familiar to those skilled in the art can be utilized in accordance with the present invention. Compositions having increased levels of linear starch polymers are most likely to be the correct choice in terms of processability, film forming, molding and mechanical properties. The starch component in the chemically modified starch composition is 5% to 90% by weight, preferably from 50% to 80% by weight.

A plasticizer is added to the inventive compositions to achieve greater material processability and product flexibility, although plasticizers typically soften the compositions in which they are included. The preferred plasticizers are polyhydric alcohols. More preferably, glycerol is used as a suitable plasticizer since it induces high flexibility, is virtually odorless, has a relatively high boiling point, is biodegradable, and is commercially available at a reasonable cost. Plasticizer concentration in the final chemically modified starch product is 15% to 50% by weight and preferably from 20% to 30% by weight.

The preferred modifiers that are useful in the present invention are to provide a chemically modified starch ester product. The starch ester product may preferentially be formed by reaction of the starch hydroxyl groups with a dibasic acid or cyclic anhydride to obtain ester linkages with pendant carboxylic groups as shown in Scheme I. The derived pendant carboxylic group can also catalyze the aforementioned reaction between the hydroxyl groups on the starch, and the dibasic acids or their cyclic anhydrides. The more preferred dibasic acids and their cyclic anhydrides include maleic-, succinic-, itaconic-, phthalic- and stearic anhydrides and combinations thereof. The modifier is preferably present in amount of about 0.5% to about 10% by weight of the starch polymer and also provides an acidic environment for the mixture.

Optionally, a free radical initiator may be used for improving the melt-strength of chemically modified starch product. It is preferred that the free radical initiator be an organic peroxide such as 2,5-dimethyl-2,5-bis(tert-butylperoxy) hexane, tert-butylperoctoate, tert-butylperoxypivalate, dicumylperoxide, 1,1-bis(tert-butylperoxy)-3,3,5-trimethylcyclohexane, bis(tert-butylperoxy-isopropyl)benzene and the like. Azo compounds, such as azobisisobutyronitrile can be also used. The free radical initiator is present in the amount of 0.01 to 2.0 wt percent of the total mass.

The present invention also relates to a biodegradable chemically modified starch-nano clay product, prepared by reactive extrusion processing of starch in the presence of modifiers, plasticizers, and nanoclay material.

Nanoclays can be useful to provide an increased mechanical strength, flame retardancy, gas barrier properties, and improved barrier to water vapor for chemically modified nanoclay starch product (ii). Another preferred embodiment is that the nanoclays useful for the present invention are well-dispersed in the biodegradable chemically modified starch-clay product. The preferred nanoclays are smectite, hectorite clays including phyllosilicates such as smectite clay minerals, e.g., montmorillonite, particularly sodium montmorillonite; bentonite; hectorite; saponite; stevensite; beidellite; and the like. The clays used are typically smectite clays, particularly bentonite and hectorite, Smectite clays possess some structural characteristics similar to the better-known minerals talc and mica. The preferred range of nanoclays is ranging from 0.5 to 25 wt % of the total mass.

The reactive modification process of starch to form chemically modified plasticized starch (CMPS) in an extruder prevents the traditionally seen problems, such as clogging of the plasticized starch melt at the die or foaming of the plasticized starch melt at the die, observed during the regular thermo-plasticization of starch. The apparatus used in carrying out the extrusion process may be any screw type extruder. While the use of a single or twin screw extruder may be used, it is preferred to use a twin-screw extruder. Such extruders will typically have rotating screws in a horizontal cylindrical barrel with an entry port mounted over one end and a shaping die mounted at the discharge end. When twin screws are used, they may be co-rotating and intermeshing or non-intermeshing. Each screw will comprise a helical flight or threaded sections and typically will have a relatively deep feed section followed by a tapered transition section and a comparatively shallow constant-depth meter section. The motor driven screws, generally fit snugly into the cylinder or barrel to allow mixing, heating and shearing of the material as it passes through the extruder.

Control of the temperature along the length of the extruder barrel is important and is accomplished in zones along the length of the screw. Heat exchange means, typically a passage such as a channel, chamber or bore located in the barrel wall, for circulating a heated media such as oil, or an electrical heater such as calrod or coil type heaters, are often used. Additionally, heat exchange means may also be placed in or along the shaft of the screw device.

Variations in any of the elements used in the extruder may be made as desired in accordance with conventional design practices. A further description of extrusion and typical design variations can be found in "Encyclopedia of Polymer Science and Engineering", Volume 6, 1986, pp. 571 to 631.

In carrying out the extrusion process, temperatures in the extruder will vary depending on the particular material, desired properties and application. They can generally range from about 100.degree. to 250 degree. C. and preferably will range from about 150.degree. to 200.degree. C.

Further, the biodegradable chemically modified starch (i), and biodegradable chemically modified starch-nanoclay compositions (ii) can be manufactured in a one-step process; wherein the components were previously mixed together, and were then introduced into the feed throat of a twin-screw extruder (such as a Century ZSK-30 co-rotating twin screw extruder) at a feed rate of 500–9000 g/hr by means of a solid metering. Alternatively, the components may be separately introduced in the case of liquid component by means of a peristaltic pump, and in the case of solid component by means of a solid metering at a feed rate of 40–8000 g/hr.

The biodegradable, chemically modified starch composition and the biodegradable, chemically modified starch-nanoclay compositions are particularly useful for manufacturing starch-polyester graft copolymers as described in our co pending patent application referred to previously.

The following experimental examples demonstrate the utility of the present invention for forming biodegradable chemically modified starch (i), and biodegradable chemically modified starch-nanoclay (ii) compositions.

Examples of materials made in accordance with the present invention are biodegradable as demonstrated by standard ASTM test methods.

EXAMPLES

Example 1

Figure 1:
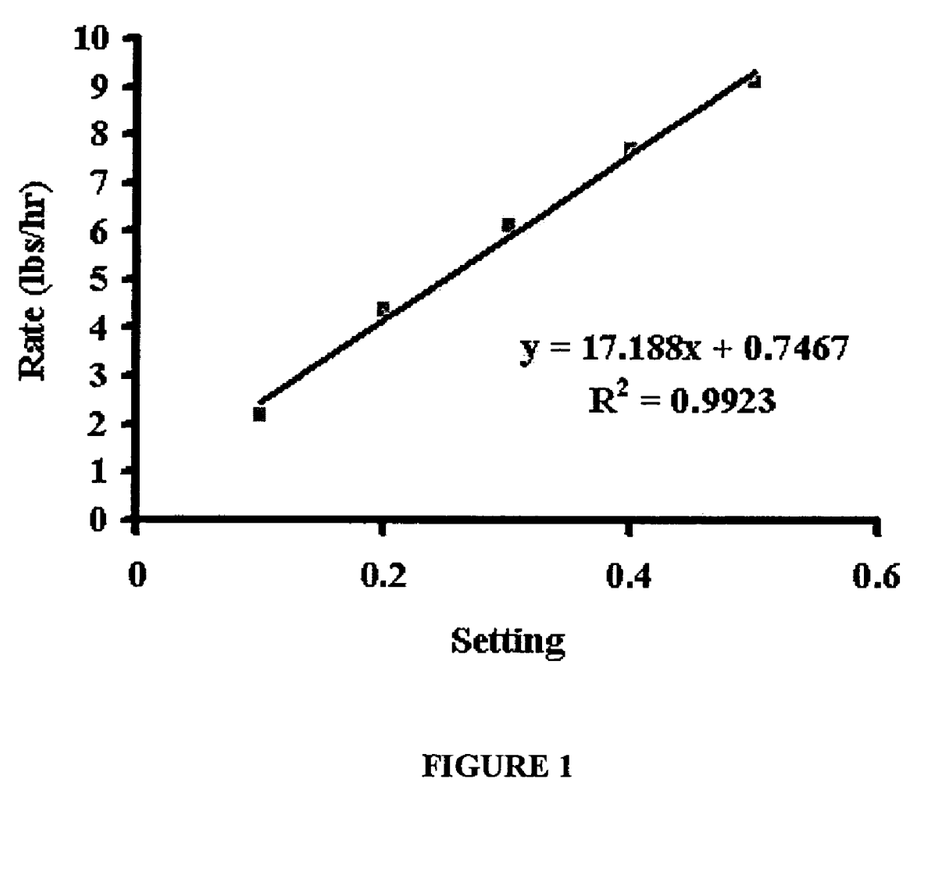
FIG. 1 is a graph which depicts the calibration curve of the glycerol pump used in the synthesis of chemically modified plasticized starch (CMPS); by reactive extrusion processing using maleic anhydride or maleic acid modifier.
Figure 2:
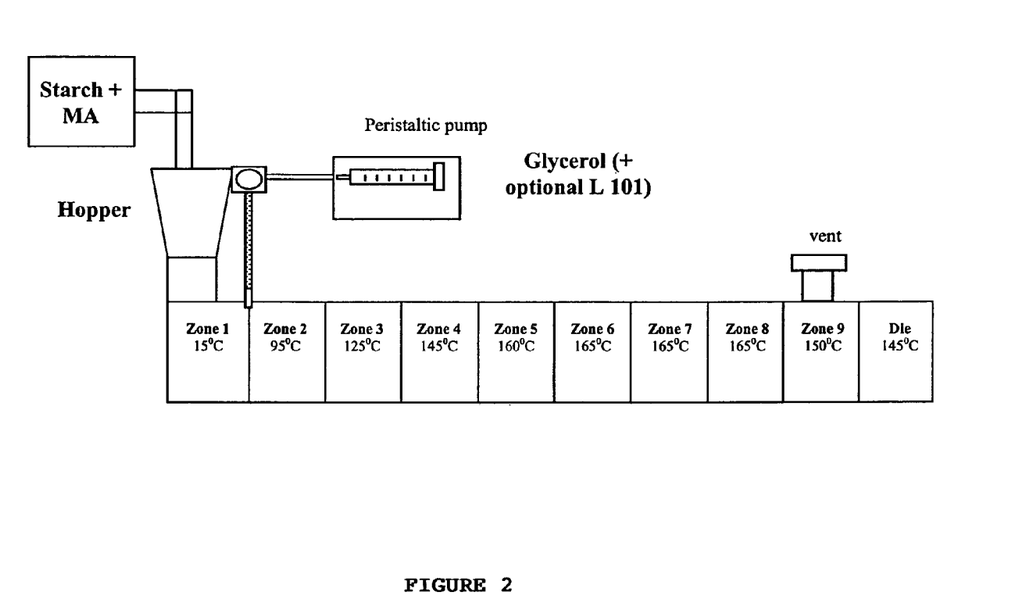
FIG. 2 is an extrusion flow apparatus diagram for the preparation of CMPS.
Figure 3A:
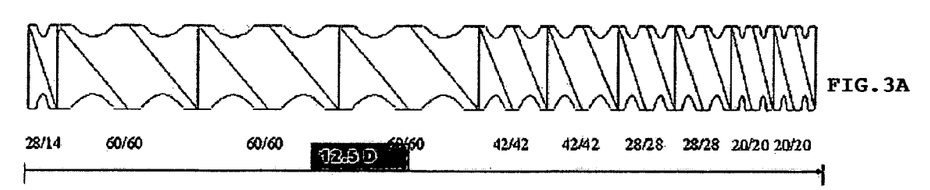
FIGS. 3A, 3B and 3C show the screw configurations used for reactive extrusion processing in the synthesis of CMPS.
Figure 3B:
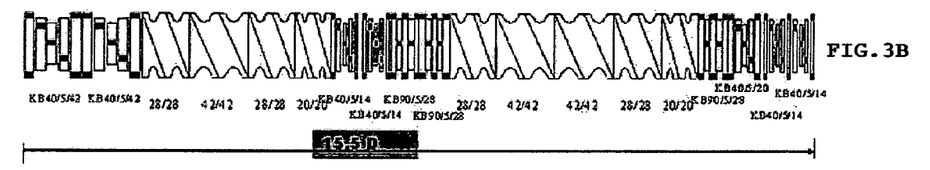
Figure 3C:
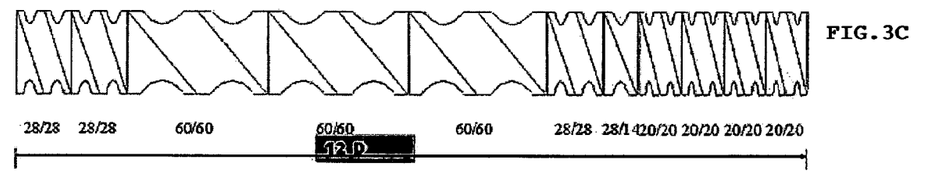

Chemical modification of starch polymer was carried out as follows:

Regular silver pearl corn-starch, obtained from Cargill Inc. was reactively modified using maleic anhydride/maleic acid in a twin-screw co-rotating CENTURY extruder with a screw diameter of 30 mm and a L/D ratio of 40. Maleic anhydride (MA) was ground to a fine powder using a mortar and pestle and mixed with the starch (800 gm starch+[20 gm] maleic anhydride) using a kitchen blender for 15 minutes before being fed to the feed port of the extruder. Glycerol was mixed with 2,5-Bis (tert-butylperoxy)-2,5-dimethylhexane (Luperox 101) {200 gm glycerol+1.6 gm Luperox 101} and pumped to the extruder using a peristaltic pump. The relative rates of the starch/MA mixture to the glycerol/Luperox 101 mixtures were maintained at 80:20. The calibration curve for the glycerol pump is shown in FIG. 1. The screw configuration used for the maleation consisted of conveying and kneading elements as shown in FIGS. 3A to 3C. A water vacuum was applied at the vent port to remove the unreacted maleic acid/water mixture. The chemically modified plasticized starch, CMPS, was collected and ground to a fine powder. Ground CMPS was stored in an oven at 50° C. The extrusion processing conditions for the reactive maleation is outlined in Table 1.

TABLE 1

Extrusion Processing conditions in the synthesis of CMPS

| ZONE | SET | ACTUAL | UNITS |
|---|---|---|---|
| ZONE1 | 15 | 39 | ° C. |
| ZONE2 | 95 | 103 | ° C. |
| ZONE3 | 125 | 122 | ° C. |
| ZONE4 | 145 | 146 | ° C. |
| ZONE5 | 160 | 157 | ° C. |
| ZONE6 | 165 | 161 | ° C. |
| ZONE7 | 165 | 167 | ° C. |
| ZONE8 | 165 | 164 | ° C. |
| ZONE9 | 150 | 156 | ° C. |
| DIE | 145 | 147 | ° C. |
| MELT TEMP. |  | 148 | ° C. |
| MOTOR SPEED |  | 125 | RPM |
| TORQUE |  | 35 | % |
| PRESSURE |  | 92 | Psia |
| FEEDER SPEED, CENTURY |  | 155 (Rate = 12.3 lbs/hr) | % |
| GLYCEROL PUMP |  | 0.1 (Rate = 3.07 lbs/hr) | % |
| FEEDER SPEED, EXT |  | — | % |

Figure 4:
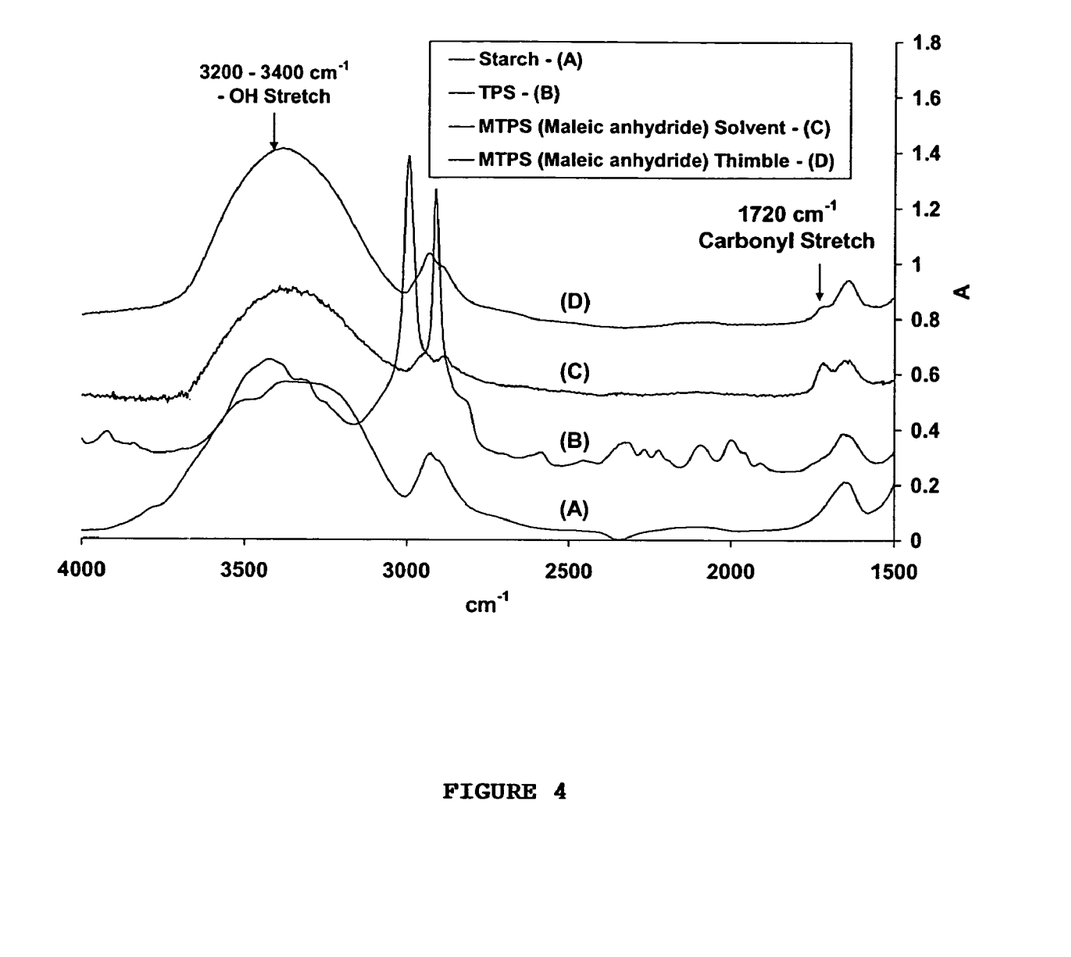
FIG. 4 is a graph showing FTIR results of CMPS samples produced using maleic anhydride modifier by the reactive extrusion processing. CMPS samples were extracted in THF solvent using a Soxhlet apparatus. Residue from the thimble of the apparatus was dried to constant weight and FTIR analysis conducted. Solvent was evaporated from the extract and the extract dried to constant weight and FTIR analysis conducted.

CMPS produced was extracted using tetrahydrofuran (THF) in a Soxhlet apparatus to remove the unreacted maleic anhydride and maleic acid (formed by reaction with water present in starch). FTIR analysis (FIG. 4) of the Soxhlet residue (after drying in an oven at 50° C. overnight) confirmed grafting of the maleic anhydride onto the starch backbone with the presence of the ester carbonyl peak at 1720 cm$^{-1}$.

Example 2

Figure 5:
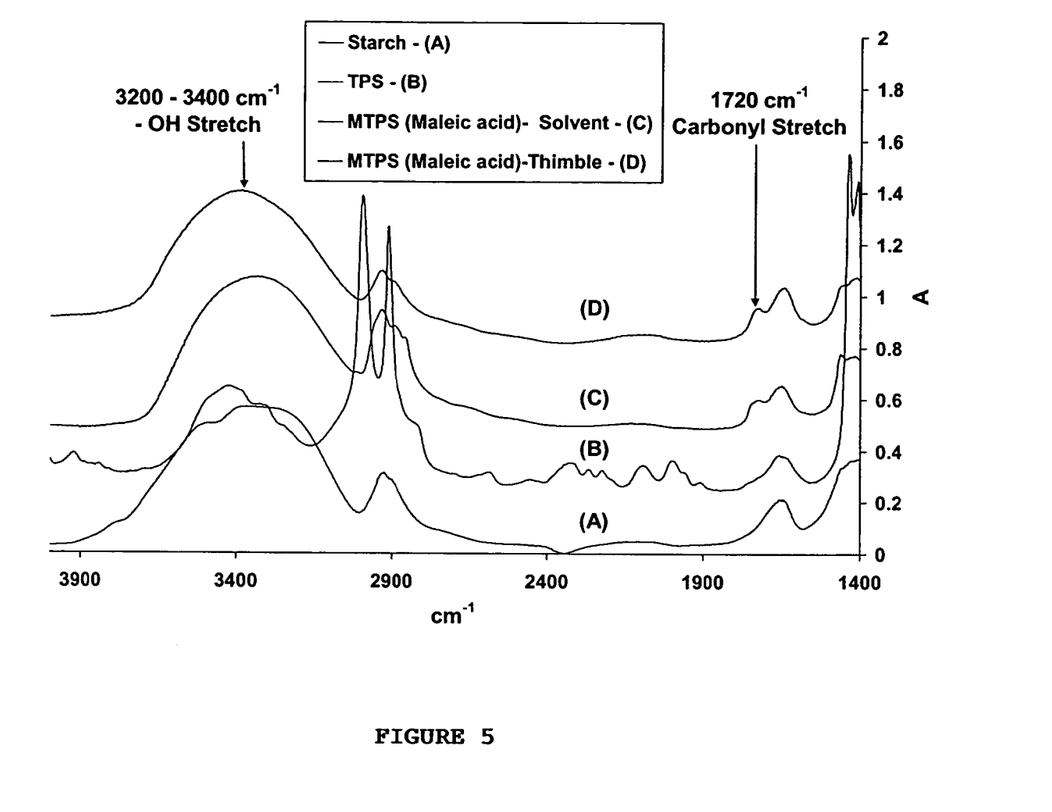
FIG. 5 is a graph showing the FTIR results of CMPS samples produced using maleic acid modifier by reactive extrusion processing. CMPS samples were extracted in THF solvent using a Soxhlet apparatus. Residue from the thimble was dried to constant weight and FTIR analysis conducted. Solvent was evaporated from the extract and the extract dried to constant weight and FTIR analysis conducted.

The procedure given in Example 1 was followed using maleic acid modifier instead of maleic anhydride. CMPS produced was extracted using tetrahydrofuran (THF) in a Soxhlet apparatus to remove the unreacted maleic acid. FTIR analysis (FIG. 5) conducted on the Soxhlet residue (after drying in an oven at 50° C. overnight) confirmed grafting of the maleic acid onto the starch backbone with the presence of the ester carbonyl peak at 1720 cm$^{-1}$.

Example 3

The procedure in Example 1 was followed to produce CMPS modified using 2.4-wt %, maleic anhydride, both with and without the initiator. Chemically modified plasticized starch (CMPS) was produced by plasticization of regular corn starch (Corn Products, Inc-Brazil) using 20-wt % glycerol plasticizer in a twin-screw extruder. The intrinsic viscosity of starch, PS, CMPS (2.4-wt % maleic anhydride and 0.1-wt % Luperox 101) and CMPS (no Luperox 101) were determined in DMSO solvent using Cannon Ubeholde viscometer (0B). The intrinsic viscosity of starch was around 1.6 dl/g while that of PS reduced to 1.2 dl/g. However, on maleation without addition of Luperox 101, the intrinsic viscosity of CMPS drastically dropped to 0.29 dl/g. This reduction is attributed to a decrease in molecular weight due to the hydrolysis of starch in the presence of maleic acid. However, on addition of Luperox 101, the intrinsic viscosity increased slightly to 0.31 dl/g. This increase is attributed to branching or cross-linking reactions occurring.

Example 4

Chemical modification of starch polymer to form chemically modified plasticized starch-nano clay products.

Regular silver pearl corn-starch, obtained from Cargill Inc. was reactively modified using maleic anhydride/maleic acid in a twin-screw co-rotating CENTURY™ extruder with a screw diameter of 30 mm and a L/D ratio of 40 in the presence of BENTONE 166™, which is an alkylaryl ammonium hectorite clay, obtained from Elementis Specialties (Highstown, N.J.), with greatly improved dispersability characteristics. Maleic anhydride (MA) was ground to a fine powder using a mortar and pestle and mixed with the starch (800 gm starch+20 gm maleic anhydride+150 gm BENTONE 166) using a kitchen blender for 15 minutes before being fed to the feed port of the extruder. 200 gm glycerol was pumped to the extruder using a peristaltic pump. The relative rates of the starch/MA/BENTONE 166 mixture to the glycerol were maintained at 80:20.

Example 5

The procedure in Example 4 was followed to produce CMPS modified using 2.5-wt %, maleic anhydride and BENTONE 111™, which is an organic derivative of a special smectite clay, obtained from Elementis Specialties.

Maleic anhydride (MA) was ground to a fine powder using a mortar and pestle and mixed with the starch (800 gm starch+20 gm maleic anhydride+150 gm BENTONE 111) using a kitchen blender for 15 minutes before being fed to the feed port of the extruder. 200 gm glycerol was pumped to the extruder using a peristaltic pump. The relative rates of the starch/MA/BENTONE 111 mixture to the glycerol were maintained at 80:20.

Example 6

The procedure in Example 4 was followed to produce CMPS-clay product using 2.5-wt %, maleic anhydride and Cloisite 30B™, which is a montmorillonite clay modified with dihydroxy quaternary ammonium salt obtained from Southern Clay Products.

Preferably the starch esters with the plasticizer (glycerol) have a viscosity in the range of about 0.15 to 0.3 dl/gram in DMSO. Natural starch has a viscosity of 1.51 dl/gm and plasticized starch has a viscosity of 1.20 dl/gm. Thus there is a significantly reduced viscosity.

It is intended that the foregoing description be only illustrative of the present invention and that the present invention be limited only by the hereinafter appended claims.

We claim:

1. A biodegradable, chemically modified starch based composition which comprises a reactively extruded mixture comprising a biodegradable starch polymer, a chemical modifier selected from the group consisting of a dibasic organic acid, an anhydride of a dibasic organic acid and mixtures thereof, a plasticizer optionally a free radical initiator for the reaction and a nanoclay, wherein the mixture has been extruded with heating and venting of water from the mixture.

2. The composition of claim 1 wherein said starch polymer is selected from the group consisting of cornstarch, potato starch, tapioca starch, rice starch, wheat starch, and cassava starch.

3. The composition of claim 1 wherein the starch polymer in the mixture is present in an amount between about 5% to 90% by weight of the mixture.

4. The composition of claim 1 wherein starch polymer is an unmodified, oxidized or thin boiling starch of 0 to 95 degree fluidity.

5. The composition of claim 1 wherein the starch polymer has moisture content of about 0.5% to 15% by weight.

6. The composition of claim 1 wherein said starch polymer is in a pulverized form.

7. The composition of claim 1 wherein the plasticizer is a polyhydric alcohol.

8. The composition of claim 1 wherein the plasticizer is present in an amount between about 10 to 50 wt. % of the mixture.

9. The composition of claim 1 wherein the chemical modifier is the dibasic organic acid.

10. The composition of claim 1 wherein the chemical modifier is the anhydride.

11. The composition of claim 1 wherein the chemical modifier is present in an amount between about 0.5% to about 10% by weight of the starch polymer.

12. The composition of claim 1 wherein the nanoclay is selected from a group consisting of montmorillonite; smectite, hectorite and mixtures thereof.

13. The composition of claim 1 wherein the nanoclay is present in an amount between about 0.5 to 25 wt. % of the mixture.

14. The composition of claim 1 wherein the free radical initiator is present and is 2,5-Bis(tert-butylperoxy)-2,5-dimethylhexane.

15. The composition of claim 1 wherein the free radical initiator is present in the mixture in an amount between about 0.01 to 2.0 wt. % of the mixture.

16. The composition of claim 1 wherein the mixture is processed in a twin-screw extruder at a temperature in the range of about 100° C. to 200° C.

17. The composition of claim 1 wherein the acids or anhydrides are selected from the group consisting of maleic-, succinic-, itaconic-, phthalic- and mixtures thereof.

18. The composition of claim 1 wherein the chemical modifier is about 2% to 5% by weight of the starch polymer of the mixture.

19. The composition of claim 1 wherein the plasticizer is glycerol.

20. The composition of claim 1 wherein the plasticizer is about 15 to 30% by weight of the composition.

21. The composition of claim 1 wherein the acid is maleic acid and the anhydride is maleic anhydride.

22. A process for preparing a starch based composition which comprises reactively extruding a mixture which comprises a biodegradable starch polymer, a chemical modifier selected from the group consisting of a dibasic organic acid, an anhydride of a dibasic organic acid and mixtures thereof, a plasticizer and a nanoclay and, optionally a free radical initiator wherein the mixture is extruded in absence of added water with heating and venting of water in the starch polymer from the mixture during the extrusion.

23. The process of claim 22 wherein the starch polymer and modifier are mixed as powders.

24. The process of claim 22 wherein the processing is at a temperature between about 130 and 180° C.

* * * * *